(12) United States Patent
Golecki et al.

(10) Patent No.: US 6,173,612 B1
(45) Date of Patent: *Jan. 16, 2001

(54) STABLE METALLIZATION FOR ELECTRONIC AND ELECTROMECHANICAL DEVICES

(75) Inventors: Ilan Golecki, Parsippany; Margaret Eagan, Boonton Township, both of NJ (US)

(73) Assignee: AlliedSignal Inc., Morristown, NJ (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/187,288

(22) Filed: Nov. 5, 1998

Related U.S. Application Data

(60) Provisional application No. 60/094,473, filed on Jul. 27, 1998.

(51) Int. Cl.[7] ................................... G01P 15/10
(52) U.S. Cl. ..................... 73/514.29; 73/862.59
(58) Field of Search .................... 73/514.29, 514.16, 73/514.21, 514.23, 514.36, 862.59; 257/417

(56) References Cited

U.S. PATENT DOCUMENTS

| 4,912,990 | * | 4/1990 | Norling .......................... 73/DIG. 1 |
| 5,164,339 | * | 11/1992 | Gimpelson ........................ 437/235 |
| 5,638,946 | * | 6/1997 | Zavracky ........................ 73/514.16 |
| 5,914,507 | * | 6/1999 | Polla et al. ..................... 73/514.21 |

* cited by examiner

Primary Examiner—John E. Chapman

(57) ABSTRACT

Described are various improved methods of forming electronic devices, electro-mechanical devices, force-sensing devices, and accelerometers. Also described are various improved electronic devices, electro-mechanical devices, force-sensing devices, and accelerometers. The device comprises a plurality of vibrating beams joined with a support portion and configured for movement relative to the support portion. A layer of electrically conductive material is disposed over at least some of the surface of the moveable portion and support portion, the layer comprising an inert or a noble material having a Young's modulus which is greater than that of elemental gold. Alternatively, the layer may comprise an inert material having a coefficient of expansion which is less than that of elemental gold.

8 Claims, 2 Drawing Sheets

STABLE METALLIZATION FOR ELECTRONIC AND ELECTROMECHANICAL DEVICES

CROSS-REFERENCE TO RELATE APPLICATION

This application claims priority from U.S. Provisional Application No. 60/094,473, filed on Jul. 27, 1998, and incorporated by reference herein.

TECHNICAL FIELD

The present invention relates generally to methods of forming electronic devices, to methods of forming electro-mechanical devices, to methods of forming force-sensing devices, to methods of forming accelerometers, to electronic devices, to electro-mechanical devices, to force-sensing devices, and to accelerometers.

BACKGROUND OF THE INVENTION

Electronic devices and electro-mechanical devices are devices which can include both electrical and mechanical parts. Sometimes, because of the nature of these parts, the way they interact with one another, and the environment within which they are used, the parts can be adversely affected. Exemplary electronic and electro-mechanical devices in the form of force-sensing transducers are described in U.S. Pat. Nos. 5,367,217, 5,339,698, and 5,331,242, the disclosures of which are incorporated by reference. Exemplary accelerometers are described in U.S. Pat. Nos. 5,594,170, 5,501,103, 5,379,639, 5,377,545, 5,456,111, 5,456,110, and 5,005,413, which are incorporated by reference herein. Other types of electronic and electro-mechanical devices can be used as rate sensors. Exemplary rate sensors are described in U.S. Pat. Nos. 5,717,140, 5,376,217, 5,696,323, 5,691,472, and 5,668,329, which are incorporated by reference herein. Yet other electronic or electro-mechanical devices can be used as acceleration and rate sensors. Exemplary sensors are described in U.S. Pat. Nos. 5,627,314, 5,557,046, 5,341,682, 5,331,853, 5,331,854, and 5,319,976, the disclosures of which are incorporated by reference herein.

One type of electronic or electro-mechanical device is an accelerometer. Accelerometers can have mechanical parts which experience acceleration forces, and electrical parts to help set up conditions conducive to sensing such forces, and to assist in sensing such forces. Yet, these electrical and mechanical parts can sometimes experience problems which adversely impact their performance.

For example, micromachined silicon accelerometers can exhibit undesirable resonator frequency drift at temperatures below 200° C. and even at room temperature. This drift is believed to be due to "creep" or plastic deformation in a current-carrying, evaporated chromium/gold or chromium/molybdenum/goldmetallization layer following 400° C. wafer bonding in air. This drift can degrade the performance of a device and can limit its accuracy and its marketability.

The frequency drift can be directly attributed to structural changes which take place in the top, thicker gold layer (typically around 0.2–0.7 micron in thickness). The plastic deformations and creep in the gold layer are due to a low Young's modulus, low hardness and low tensile strength of gold. A much thinner chromium layer (around 100 Angstrom) is used to improve the adhesion of the gold or molybdenum to an underlying thermal silicon dioxide ($SiO_2$) and does not appreciably contribute to the overall resistance or current-carrying capacity. In addition to the above-described creep, gold and chromium, or gold and molybdenum in thin-film form show significant undesirable interdiffusion among themselves in the above temperature range. This can result in an undesirable increased resistivity and visual splotchiness in an otherwise uniform mirror-like appearance of the layers.

Accordingly, there is a need for a more stable metallization, and one which can mitigate some of the problems experienced in electronic or electro-mechanical devices having mechanical and electrical parts. Particularly, there is a need within the context of accelerometers for stable metallization which would mitigate resonator drift frequency, and which would have reduced or no interdiffusion when in contact with chromium or other adhesion-promoting layers. Further, there is a need for materials which exhibit stable resistivity and visual appearance. In addition, an improved metallization scheme should desirably exhibit relatively low electrical sheet resistance, e.g. about 0.25 ohm/square at a total thickness of less than one micron, and good bondability to gold wire. Stress in the metallization should also be desirably as low as possible.

SUMMARY OF THE INVENTION

Methods of forming electronic devices, methods of forming electro-mechanical devices, methods of forming force-sensing devices, methods of forming accelerometers, electronic devices, electro-mechanical devices, force-sensing devices, and accelerometers are described.

In one embodiment, a structure is provided having a movable portion and a support portion connected therewith. A layer of electrically conductive material is formed over the structure and positioned to carry electrical current. The layer is formed over at least some of the movable portion and some of the support portion, and comprises an inert or noble material having a Young's modulus at room temperature which is greater than that of elemental gold at room temperature.

In another embodiment, a force-sensing substrate is provided having a force-sensing element. An electrically conductive layer comprising a noble metal is formed over the force-sensing element and is selected from a group of noble metals each of which having a Young's modulus at room temperature greater than the Young's modulus of elemental gold at room temperature.

In another embodiment, a crystalline substrate is provided having a force-sensing element. A layer comprising electrically conductive material is formed over the force-sensing element. The layer has a Young's modulus greater than about 350 GPa.

In another embodiment, an electro-mechanical device comprises a support portion and a movable portion joined with the support portion. The movable portion is configured for movement relative to the support portion. A layer of electrically conductive material is disposed over at least some of the movable portion and some of the support portion. The layer comprises an inert or noble material having a Young's modulus at room temperature which is greater than that of elemental gold at room temperature.

In yet another embodiment, an accelerometer includes a substrate having a proof mass and a vibratable assembly connected therewith. The proof mass and vibratable assembly are configured to detect an acceleration force. An electrically conductive path is disposed over the vibratable assembly and comprises an electrically conductive inert or noble material having a Young's modulus at room temperature which is greater than that of elemental gold at room temperature.

In still another embodiment, an accelerometer comprises a substrate having a proof mass and a vibratable assembly connected therewith. The proof mass and vibratable assembly are configured to detect an acceleration force. An electrically conductive path is disposed over the vibratable assembly and comprises an inert or noble material having a coefficient of thermal expansion less than that of elemental gold.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
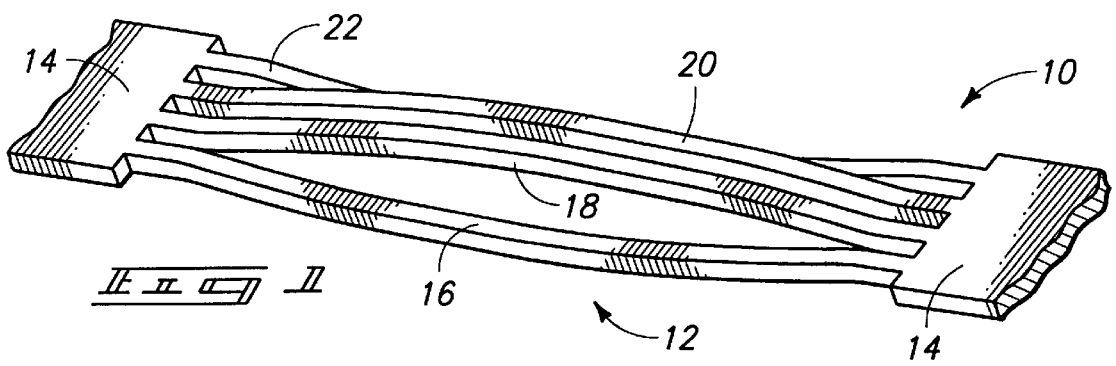
FIG. 1 is a perspective view of an electronic or electro-mechanical device which can be utilized in connection with one or more embodiments of the invention.
Figure 2:
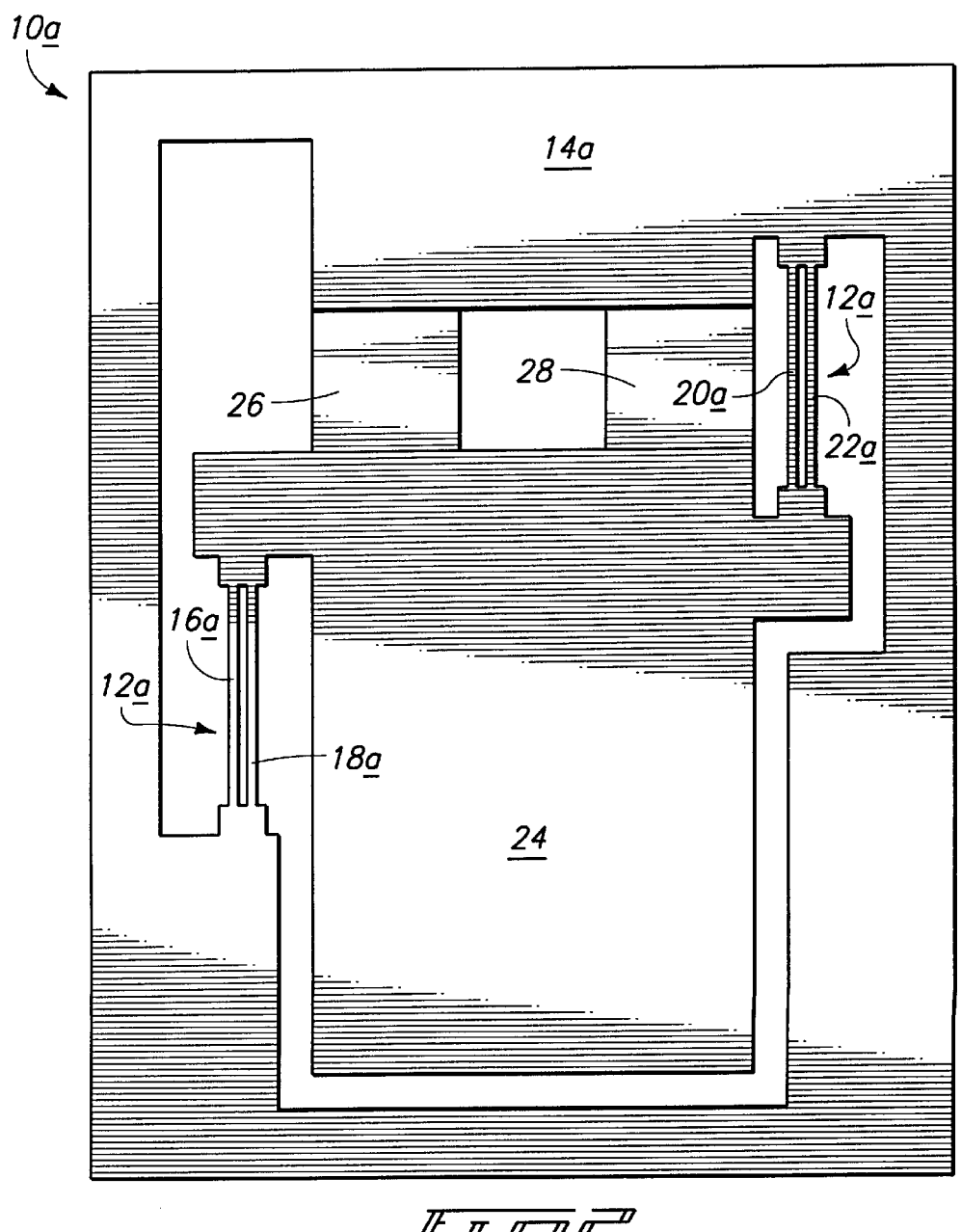
FIG. 2 is a top plan view of another electronic or electro-mechanical device which can be utilized in connection with one or more embodiments of the present invention.

FIGS. 1 and 2 show exemplary electronic or electro-mechanical devices generally at 10 and 10a respectively. Devices 10 and 10a comprise respective structures having movable portions 12, 12a, and support portions 14, 14a connected therewith. In the illustrated example, the structures' movable and support portions are formed from a crystalline material, e.g. a silicon-containing material such as monocrystalline silicon. In a preferred embodiment, the structures are provided by etching the movable and support portions from the crystalline material in a known manner. Such is described in more detail in some of the references incorporated above. Other electronic or electro-mechanical devices can, of course, be provided by the embodiments of the invention described below. These devices need not, however, necessarily be formed from a crystalline material such as the monocrystalline silicon mentioned above.

In one embodiment, devices 10, 10a comprise force-sensing transducers or devices including respective force-sensing substrates 14, 14a, having respective force-sensing elements 12, 12a. The force-sensing substrates and elements are preferably provided by etching a crystalline material, e.g. monocrystalline silicon. In one embodiment, force-sensing elements 12, 12a comprise vibratable force-sensing elements. In a preferred embodiment, pairs of vibratable beams 16, 18 and 20, 22 (FIG. 1) and 16a, 18a, and 20a, 22a (FIG. 2) are etched from the crystalline material. The specific illustrated embodiments can, of course, have more or less vibratable beams.

FIG. 2 shows an electronic or electro-mechanical device in the form of an accelerometer. The accelerometer is preferably formed from a single wafer of silicon through micro-machining techniques. Accelerometers such as this and others are described in U.S. Pat. No. 5,005,413 which is incorporated by reference above.

Accelerometer 10a is configured as a force-sensing transducer which senses an acceleration force which acts upon the accelerometer. In this example, substrate 14a includes a proof mass 24 and a vibratable assembly 12a connected or joined therewith and configured to detect an acceleration force. Proof mass 24 is supported by a pair of flexures 26, 28. In this example, device 10a comprises a vibrating beam accelerometer whose vibratable assembly 12a comprises a plurality of vibratable beams 16a, 18a, and 20a, 22a. The beams are arranged, together with proof mass 24, in a configuration which develops different vibratory frequencies responsive to movement or deflection of proof mass 24 in accordance with an acceleration applied thereto. The various frequencies at which the beams vibrate give an indication of the acceleration force acting upon the proof mass. The acceleration-sensing operation of this device is described in U.S. Pat. No. 5,379,639, incorporated by reference above.

Briefly, vibratable assembly 12a is configured into a push-pull configuration such that when proof mass 24 experiences an acceleration, it is moved or deflected along an input axis either into or out of the plane of the page upon which FIG. 2 appears. Such movement or deflection causes one of the pairs of beams 16a, 18a or 20a, 22a to go into tension and the other of the pairs of beams to go into compression. As this compression and tension occurs, the respective frequencies at which the beams vibrate change in a known and measurable manner.

Figure 3:
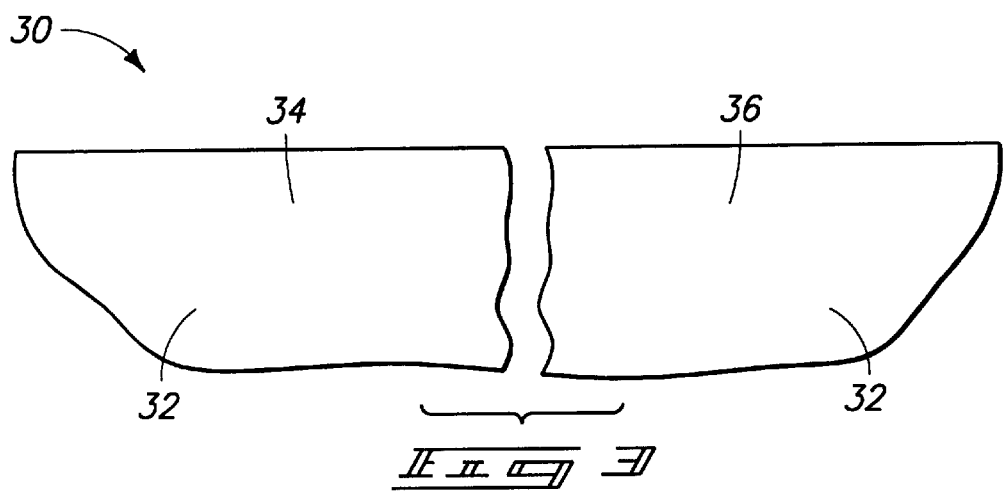
FIG. 3 is a diagrammatic side sectional view of a substrate, in process, in accordance with one or more embodiments of the present invention.

FIG. 3 shows a substrate at 30. Substrate 30 preferably comprises a substrate which forms a portion of an electronic or electro-mechanical device. The device can comprise one such as those described above in FIGS. 1 and 2, or other types of devices.

In one embodiment, substrate 30 comprises a crystalline material 32. Exemplary crystalline materials include various silicon-containing materials such as the monocrystalline silicon substrates mentioned above. The structure provided by substrate 30, in a preferred embodiment, includes a movable portion 34 and a support portion 36 connected or joined therewith. In some embodiments, particularly those comprising silicon transducers, accelerometers, and rate sensors, a thin thermal silicon dioxide layer can be formed or provided over the substrate prior to formation of the conductive material described just below. Exemplary devices are described in the references incorporated above.

Figure 4:
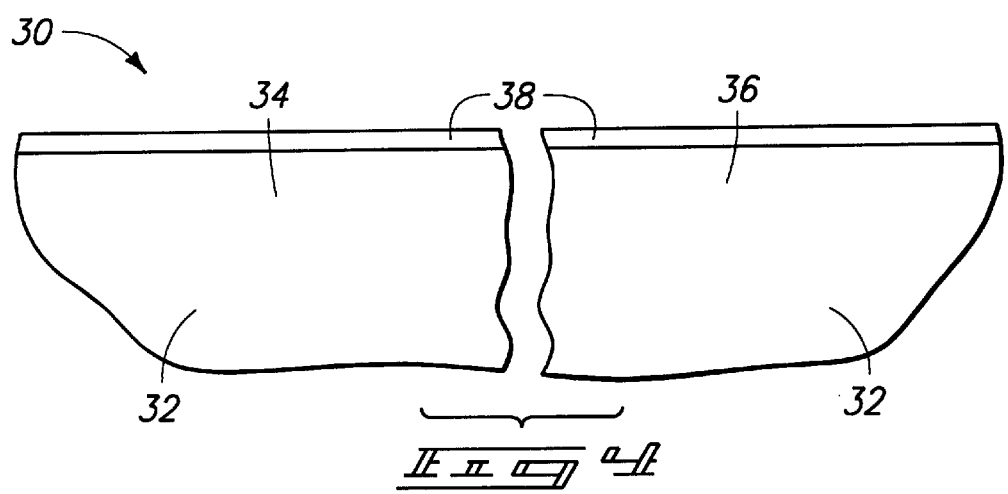
FIG. 4 is a view of the FIG. 3 substrate at a processing step which is subsequent to that which is shown in FIG. 3.

FIG. 4 shows, in accordance with one embodiment, an electrically conductive material layer 38 which is formed over the structure and positioned to carry electrical current. Layer 38 is preferably formed over at least some of movable portion 34 and some of support portion 36. In one preferred embodiment, layer 38 comprises an inert material having a Young's modulus at room temperature which is greater than that of elemental gold at room temperature. In the context of this document, "inert" will be understood to mean relatively unreactive chemically.

Layer 38 can be formed over the substrate in any suitable manner. In one preferred embodiment, layer 38 is formed by physically vapor depositing the layer over substrate 30. Exemplary conditions through which such physical vapor deposition can take place are described below. In a preferred embodiment, layer 38 comprises one of iridium or rhodium which are physically vapor deposited over substrate 30.

In another embodiment, layer 38 comprises a layer which is formed over a force-sensing element, such as those described above, and which comprise an inert or noble metal selected from a group of noble metals each of which having a Young's modulus at room temperature greater than the Young's modulus of elemental gold at room temperature. In the context of this document, "noble metals" will be understood to include metals or alloys which are relatively unreactive chemically and have a relatively high resistance to corrosion and oxidation, as compared with "base" metals such as iron and copper.

In one embodiment, the noble metal has a Young's modulus greater than about 300 GPa. In another embodiment, the noble metal has a coefficient of thermal expansion at room temperature less than about 13 ppm/° C. In another embodiment, the noble metal is formed by physically vapor depositing the metal over substrate 30 to provide layer 38. Exemplary materials for the noble metal comprise iridium, rhodium, osmium, tungsten, or alloys thereof.

In another embodiment, layer 38 comprises an electrically conductive material which is formed over a force-sensing element, such as those described above, and which has a Young's modulus greater than about 350 GPa. In this example, layer 38 preferably comprises a metal or a metal alloy which is formed over the force-sensing element. Exemplary metal alloys include, but are not limited to, Au—Ni (gold-nickel), and Au—Cu (gold-copper). In another embodiment, layer 38 comprises a silicide which is formed over a force-sensing element. Exemplary silicides include, but are not limited to, titanium disilicide ($TiSi_2$) and cobalt disilicide ($CoSi_2$). In another embodiment, layer 38 comprises a carbide which is formed over a force-sensing element. Exemplary carbides include, but are not limited to, titanium carbide (TiC) and tantalum carbide (TaC). In another embodiment, layer 38 comprises a nitride which is formed over a force-sensing element. Exemplary nitrides include, but are not limited to, titanium nitride (TiN) and zirconium nitride (ZrN).

In yet another embodiment, layer 38 comprises an inert or noble material which is formed over a force-sensing element. In a preferred embodiment, the inert material has a coefficient of thermal expansion which is less than that of gold.

Many of the above materials can be deposited as thin films using physical vapor deposition or evaporation techniques which are known. Of course, other methods can be used, e.g. sputtering, molecular beam epitaxy, chemical vapor deposition and laser ablation.

In another embodiment, layer 38 comprises an electrically conductive path which is disposed over a vibratable assembly, such as those described above in connection with FIGS. 1 and 2, and the vibratable assembly is configured to detect an acceleration force. In one preferred embodiment, the electrically conductive path comprises a noble metal having a Young's modulus at room temperature which is greater than that of elemental gold at room temperature. In another embodiment, the Young's modulus is greater than about 300 GPa. In yet another embodiment, the noble metal has a coefficient of thermal expansion less than about 13 ppm/° C.

In still another embodiment, layer 38 comprises an electrically conductive path which is disposed over a vibratable assembly and comprises an inert or noble material having a coefficient of thermal expansion less than that of elemental gold.

In various embodiments of the present invention described above and below, a gold layer or gold-molybdenum bi-layer, previously utilized in connection with micromachined silicon accelerometers, is replaced by a single layer of higher-modulus (higher than gold), relatively low-resistivity, electrically conductive material, e.g. a noble metal. Exemplary metals include iridium, rhodium, osmium, and tungsten. Preferred materials are iridium and rhodium.

A comparison of the relevant published properties of the bulk materials, at room temperature, is provided in the table immediately below.

| Metal | Resistivity (micro-ohm.cm) | Young's Modulus (GPa) | Tensile Strength (MPa) | Thermal Expansion Co-efficient (ppm/° C.) |
|---|---|---|---|---|
| Au | 2.2 | 78 | 130–220 | 14.1 |
| Mo | 5.7 | 325 | 485–690 | 5.7 |
| Ir | 5.1 | 528 | 550–1200 | 7.9 |
| Rh | 4.7 | 379 | 690–2070 | 10.3 |
| Os | 8.8 | 559 | | 4.6 |
| W | 5.4 | 411 | 550–1920 | 4.5 |

Note that the values for thin films of the same materials can differ from the bulk values, depending on the fabrication methods used. As is apparent from the table, iridium, rhodium, osmium, and tungsten are much stiffer than gold, and have a much higher tensile strength. Accordingly, such materials can be used to reduce creep or other structural changes that are expected with time at temperatures below 400° C.

The electrical resistivities of these metals are in an acceptable range, and are lower than that of molybdenum (with the exception of osmium). Additionally, because metals such as iridium and rhodium are inert, whereas molybdenum is reactive with oxygen and other environmental impurities, the actually-measured resistivities of iridium and rhodium can be expected to be much closer to the published values than is the case with molybdenum, the measured resistivity of which is much higher than the published value.

The coefficients of thermal expansion (CTE) of these metals are also much closer to that of silicon (3.9 ppm/° C. at 400° C.) than the CTE of gold. The adhesion of iridium and rhodium to $SiO_2$ (via a thin chromium layer, or, even in the absence of chromium) is very good and both metals can be bonded to gold wires. Sheet resistances below 0.25 ohm/square can be obtained with total metallization thicknesses of less than one micron. No measurable interdiffusion between iridium and chromium and between rhodium and chromium has been found in the above temperature range (below 400° C.).

Further, the appearance of the thin films is mirror smooth and shiny when proper fabrication conditions are employed. Process conditions in the deposition of iridium and rhodium have been developed which meet or exceed all the requirements for a metallization described above, and preferred process parameters have been identified to obtain films with desirable properties.

In a reduction-to-practice example, either iridium or rhodium were deposited on thermally oxidized (about 5000 Angstrom oxide thickness), round, 4-inch diameter, <100> oriented, silicon-crystalline wafer substrates, using physical vapor deposition. Other thin film deposition methods known to those skilled in the art can be utilized, for example, sputtering, molecular beam epitaxy, and chemical vapor deposition.

The same or similar methods are also applicable in connection with other substrate materials, for example group III–V compounds, SiC, oxides and ceramics, substrates with other crystalline orientations, e.g. <111>, or polycrystalline or amorphous substrates, and other wafer sizes and shapes.

A chromium adhesion layer and an upper current-carrying, higher-modulus layer (e.g. iridium or rhodium) were deposited sequentially on thermally oxidized silicon single-crystalline wafers by physical evaporation in a vacuum chamber. Prior to film deposition, each wafer's curvature was measured for reference purposes, and each wafer was cleaned using techniques known to those of skill in the art. For example, wafers were degreased in organic solvents, such as methylene chloride, rinsed in acetone then isopropanol or ethanol, and in deionized water. The wafers can be placed in an ultrasonically-agitated bath during cleaning. The wafers can also be cleaned in a mixture of sulfuric acid and hydrogen peroxide, then rinsed in deionized water and dried at 100° C. The wafers can also be cleaned in an ozone plasma. Other established wafer cleaning techniques can be used.

The wafers were loaded in a physical evaporation system comprising a water-cooled vacuum chamber enclosing several metal sources which can be individually heated and melted by means of an electron beam. An exemplary system is commonly known as E-gun evaporation. Other metal heating and melting configurations can be used, for example, by means of a resistive filament. The system can be controlled manually or programmed for automatic operation. The chamber is pumped to a base pressure in the range of $1\times10^{-7}$ to $1\times10^{-6}$ Torr using a liquid-nitrogen-trapped, oil-filled, high-vacuum diffusion pump backed by an oil-lubricated rotary mechanical forepump. Other pumps can be used, for example, turbo-molecular and cryo pumps for the high-vacuum pumping backed by means of a diaphragm and claw-type oil-free rotary forepumps. The chamber was purged one or more times with argon or other inert gas (e.g. nitrogen) after initial pumpdown in order to reduce the partial pressure of water vapor, oxygen and other undesirable, especially oxidizing impurities in the air.

The wafers, which are the substrates for the metal thin films, can be heated prior to and during deposition by means of quartz halogen lamps located within the chamber. Other means of heating can also be used, for example, resistive heating of the support plates on which the wafers are positioned. The wafers are preferably positioned on an axially rotating planetary fixture and each wafer is additionally made to rotate around its own axis. The two rotations result in improved uniformity of thickness and temperature across the surface of each wafer. The temperature of the wafers is measured by means of a thermocouple positioned inside the chamber in close proximity to the surfaces of the wafers, which enables setting and controlling the temperatures of said wafers. The actual temperatures of the wafers in relation to that of said thermocouple can be measured using several techniques, e.g. by means of thermocouples attached directly to test wafers, by means of thermal dots applied to a surface of the wafers, and the like. The actual substrate temperatures can thus be determined within +/−25° C. of the thermocouple temperature.

The metal thin films are deposited by heating each metal source using the electron gun, such that a molten pool of metal is formed within the metal source; part or all of the metal source may be melted in this fashion. The metal source may be initially placed directly in a water-cooled cooper hearth or in a liner material, the latter being placed inside the copper hearth. Such practice is known in the art. If a liner material, such as graphite, is used, it is important to prevent dissolution and or mixing of the liner material with the molten pool of metal. Such mixing may result in carbon contamination in the deposited films, which may undesirably increase their sheet resistance. The heating and melting of such a metal source will result in evaporation of metal atoms and larger microscopic entities inside the chamber and will form a deposited coating on the surface the wafers which are facing the metal source. The deposition rate and the total thickness of such a layer are measured and controlled by means of a quartz crystal monitor, which is known in the art. Thus, the principal deposition parameters for every layer are the temperature of the substrates ($T_s$), the deposition rate (r, in Angstrom/second) and the total thickness (t, in Angstrom). These parameters are controlled in the physical evaporation system and they have an influence on the relevant physical properties of the deposited layers. Such properties include the sheet resistance ($R_{sh}$), stress, microstructure and impurity concentration. The values of such properties, as well as the thicknesses of the deposited films are measured after deposition by techniques known in the art.

Experiments designed to identify deposition parameters, as indicated above, which result in metallizations possessing desirable properties have been carried out. Examples of the results from such experiments for Cr/Ir are given in the table below. The Cr thickness was 100 A and Cr deposition rate was 2 A/s in these cases. Film stress was tensile in all cases (concave substrate curvature after film deposition on metallized side of the substrate).

| $t_{Ir}$ (A) | $r_{Ir}$ (A/s) | Ts (° C.) | $R_{sh}$ (ohm/square) | Film Stress (MPa) | Notes |
| --- | --- | --- | --- | --- | --- |
| 3000 | 1 | 390 | 0.30 | 2120 | |
| 4500 | 1 | 410 | 0.20 | 1550 | |
| 4500 | 1 | 350 | 0.20 | 1270 | |
| 4500 | 1.2 | 350* | 0.17 | 372 | |
| 4500 | 1.2 | 350* | 0.18 | 316 | |
| 5200 | 1.5 | 350 | 0.16 | 2120 | Delaminated later |
| 5200 | 4 | 350 | 0.34 | 2010 | Microcracked; delaminated later |
| 5200 | 1.5 | Room Temperature | 0.43 | 1260 | |
| 6000 | 4–6 | 350 | 0.26 | 2460 | Microcracked |
| 9000 | 1.5 | 300 | 0.24 | 1220 | Microcracked |

In the above table, it is seen that the best results (lowest sheet resistance and lowest stress) were obtained when the Ir film thickness was 4500 A, the Ir deposition rate was around 1 A/s and the substrate temperature was 350° C. The metal thin film depositions marked with an asterisk (*) were done with the substrate holders closer to the heating lamps, even though the temperature indicating thermocouple was positioned at approximately the same location as in the other runs and it indicated the same 350° C.; the actual substrate temperature in the runs noted with the asterisk is believed to have been about 350° C., as the thermocouple indicated, whereas in the other runs, the actual substrate temperature was somewhat lower than the thermocouple reading. Another observation is that even though several of these film stresses, calculated from the substrate curvatures before and after metallization, exceeded the nominal, published tensile strength for bulk Ir, several such films deposited under these specific conditions did not microcrack or delaminate, signifying that the actual tensile strength of such films was higher than the published bulk values. Cr/Ir films of 3000 and 4500 A Ir thickness as described above have been successfully bonded to gold wires. Device wafers metallized with Cr/Ir layers deposited using the above-described apparatus and under similar conditions as in the runs marked with the asterisk (*) have been successfully fabricated. The frequency stability was measured and found to be improved at least ten times (i.e. frequency drift was at least ten times less) than obtained in devised metallized with the previously used Cr/Au or Cr/Mo/Au metallization.

Experiments designed to identify deposition parameters, as indicated above, which result in Cr/Rh metallizations possessing desirable properties have been carried out similarly to what has been described for Cr/Ir. Examples of the results from such experiments for Cr/Rh are given in the table below. The Cr deposition rate was 2 A/s in these cases. Film stress was tensile in all cases (concave substrate curvature after film deposition on metallized side of the substrate).

| $t_{cr}$ (A) | $t_{Rh}$ (A) | $r_{Rh}$ (A/s) | $T_S$ (C°) | $R_{sh}$ (oh/square) | Film Stress (MPa) |
|---|---|---|---|---|---|
| 230 | 3000 | 1.2 | 350 | 0.25 | 820 |
| 94 | 4500 | 1.2 | 350 | 0.16 | 750 |
| 94 | 6000 | 1.2 | 350 | 0.11 | 700 |
| 94 | 9000 | 2.3 | 350 | 0.071 | 780 |
| 185 | 6000 | 1.2 | 295 | 0.10 | 560 |
| 230 | 6000 | 1.2 | 270 | 0.11 | 410 |
| 185 | 6000 | 1.2 | 240 | 0.13 | 450 |
| 230 | 6000 | 1.2 | 220 | 0.12 | 550 |
| 230 | 6000 | 1.2 | 195 | 0.14 | 950 |
| 230 | 6000 | 1.2 | 165 | 0.17 | 1290 |
| 94 | 6000 | 1.2 | Room Temperature, 130 | 0.34 | 840 |
| 94 | 6000 | 2.3 | 350 | 0.11 | 760 |
| 94 | 6000 | 4.6 | 350 | 0.11 | 730 |
| 94 | 6000 | 9.2 | 350 | 0.11 | 780 |
| 230 | 6000 | 4.6 | 270 | 0.12 | 460 |
| 230 | 6000 | 9.2 | 270 | 0.13 | 440 |

From these results several conclusions can be drawn. At nominally identical thicknesses (e.g. 4500 A), and for films which did not microcrack or delaminate, the sheet resistance obtained with Cr/Rh is slightly lower than that obtained with Cr/Ir. Thus Cr/Rh would be preferred under these conditions.

The process window for depositing Cr/Rh films is much larger than for Cr/Ir in terms of the thickness range of the Ir or Rh which results in stable, non-delaminating and non-microcracking films, as well as in terms of the substrate temperature and Rh or Ir deposition rate.

Metallizations with acceptable properties can be obtained at very high Rh deposition rates, e.g. as high as 9.2 A/s, with little or no effect on sheet resistance and stress.

The lowest sheet resistances are obtained at substrate temperatures at or above 220° C., and, in this temperature range the sheet resistance is relatively insensitive to temperature, all other conditions being equal. At temperatures below 165° C., the sheet resistance is much more sensitive to substrate temperature.

Films with the lowest stress are obtained in the substrate temperature range of approximately 240–2700° C., all other conditions being equal. Below approximately 220° C., the stress becomes higher and is very sensitive to substrate temperature. The stress also increases with temperature above 270° C.

The invention has been described in compliance with the applicable statutes. Variations and modifications will be readily apparent to those of skill in the art. It is therefore to be understood that the invention is not limited to the specific features shown and described, since the disclosure comprises preferred forms of putting the invention into effect. The invention is, therefore, to be interpreted in light of the appended claims appropriately interpreted in accordance with the doctrine of equivalents.

What is claimed is:

1. An electro-mechanical device comprising:

a support portion;

a movable portion including a plurality of vibrating beams joined with the support portion and configured for movement relative to the support portion; and a layer of electrically conductive material dispose over the surface of at least some of the moveable portion and some of the support portion, said layer comprising an inert material having a Young's modulus at room temperature which is grater than that of elemental gold at room temperature.

2. The electro-mechanical device of claim 1, wherein the support portion and moveable portion comprise a crystalline material.

3. The electro-mechanical device of claim 1, wherein the support portion and moveable portion comprise a crystalline material.

4. The electro-mechanical device of claim 1, wherein the support portion and moveable portion comprise a crystalline material, and wherein the layer of electrically conductive material comprises one of iridium or rhodium.

5. An accelerometer comprising:

a substrate having a proof mass and a plurality of vibrating beams connected therewith, the proof mass and vibrating beams beings configured to detect an acceleration force; and an electrically conductive path disposed over the surface of and contacting the vibrating beams and comprising a noble material having a Young's modulus at room temperature which is greater than that of elemental gold at room temperature.

6. The accelerometer of claim 5, wherein the Young's modulus is greater than about 300 GPa.

7. The accelerometer of claim 5, wherein the noble material has a coefficient of thermal expansion less than about 13 ppm/° C.

8. An accelerometer comprising:

a substrate having a proof mass and a plurality of vibrating beams connected therewith, the proof mass and plurality of vibrating beams being configured to detect an acceleration force; and an electrically conductive path disposed over the surface of and contacting the vibrating beams and comprising an inert material having a coefficient of thermal expansion less than that of elemental gold.

* * * * *

UNITED STATES PATENT AND TRADEMARK OFFICE
CERTIFICATE OF CORRECTION

PATENT NO.   : 6,173,612 B1  
DATED        : January 16, 2001  
INVENTOR(S)  : Golecki Ilan et al.

Page 1 of 1

It is certified that error appears in the above-identified patent and that said Letters Patent is hereby corrected as shown below:

Column 10,  
Line 27, claim 3 should read:  
"3. The electro-mechanical device of Claim 27, wherein the support portion and movable portion comprise crystalline, silicon-containing material."

Signed and Sealed this

Eighteenth Day of December, 2001

Attest:

Attesting Officer

JAMES E. ROGAN  
*Director of the United States Patent and Trademark Office*